United States Patent [19]

Burton, III et al.

[11] E Re. 29,553

[45] Reissued Feb. 28, 1978

[54] OIL SHALE RETORT FLUE GAS COOLING AND CLEANING

[75] Inventors: Robert S. Burton, III, Grand Junction, Colo.; Gordon B. French, Bakersfield, Calif.

[73] Assignee: Occidental Oil Shale, Inc., Grand Junction, Colo.

[21] Appl. No.: 816,798

[22] Filed: Jul. 18, 1977

Related U.S. Patent Documents

Reissue of:

[64] Patent No.: 3,915,498
Issued: Oct. 28, 1975
Appl. No.: 505,100
Filed: Sep. 11, 1974

[51] Int. Cl.[2] ..... E21C 41/10; E21B 43/24

[52] U.S. Cl. ..... 299/2; 166/57; 166/256

[58] Field of Search ..... 166/50, 57, 256, 302; 299/2; 208/11; 48/DIG. 6, 212

[56] References Cited

U.S. PATENT DOCUMENTS

| | | | |
|---|---|---|---|
| 1,867,758 | 7/1932 | Ranney | 299/2 |
| 2,481,051 | 9/1949 | Uren | 299/2 |
| 3,013,609 | 12/1961 | Brink | 166/256 |
| 3,228,471 | 1/1966 | Shook | 166/256 |
| 3,240,270 | 3/1966 | Marx | 166/256 X |
| 3,283,814 | 11/1966 | Schlicht et al. | 166/259 X |
| 3,486,327 | 12/1969 | Poincet et al. | 48/212 UX |
| 4,004,982 | 1/1977 | Jennings et al. | 208/11 R X |
| 4,014,575 | 3/1977 | French et al. | 299/2 |

*Primary Examiner*—Stephen J. Novosad
*Assistant Examiner*—George A. Suchfield
*Attorney, Agent, or Firm*—Christie, Parker & Hale

[57] ABSTRACT

A technique is provided for cooling the flue gas or off gas from the bottom of an in situ oil shale retort. The gas is collected in a conduit that has a vertical portion through which the gas flows upwardly. It is then withdrawn from the retort through a gas tight bulkhead. Water is sparged downwardly through the vertical portion of the conduit for cooling and cleaning the gas. Means are provided for draining the sparged water into a sump at the bottom of the retort wherein oil and water are collected. Water and oil are separated and the water may be recycled for additional cooling.

7 Claims, 2 Drawing Figures

OIL SHALE RETORT FLUE GAS COOLING AND CLEANING

Figure 2:
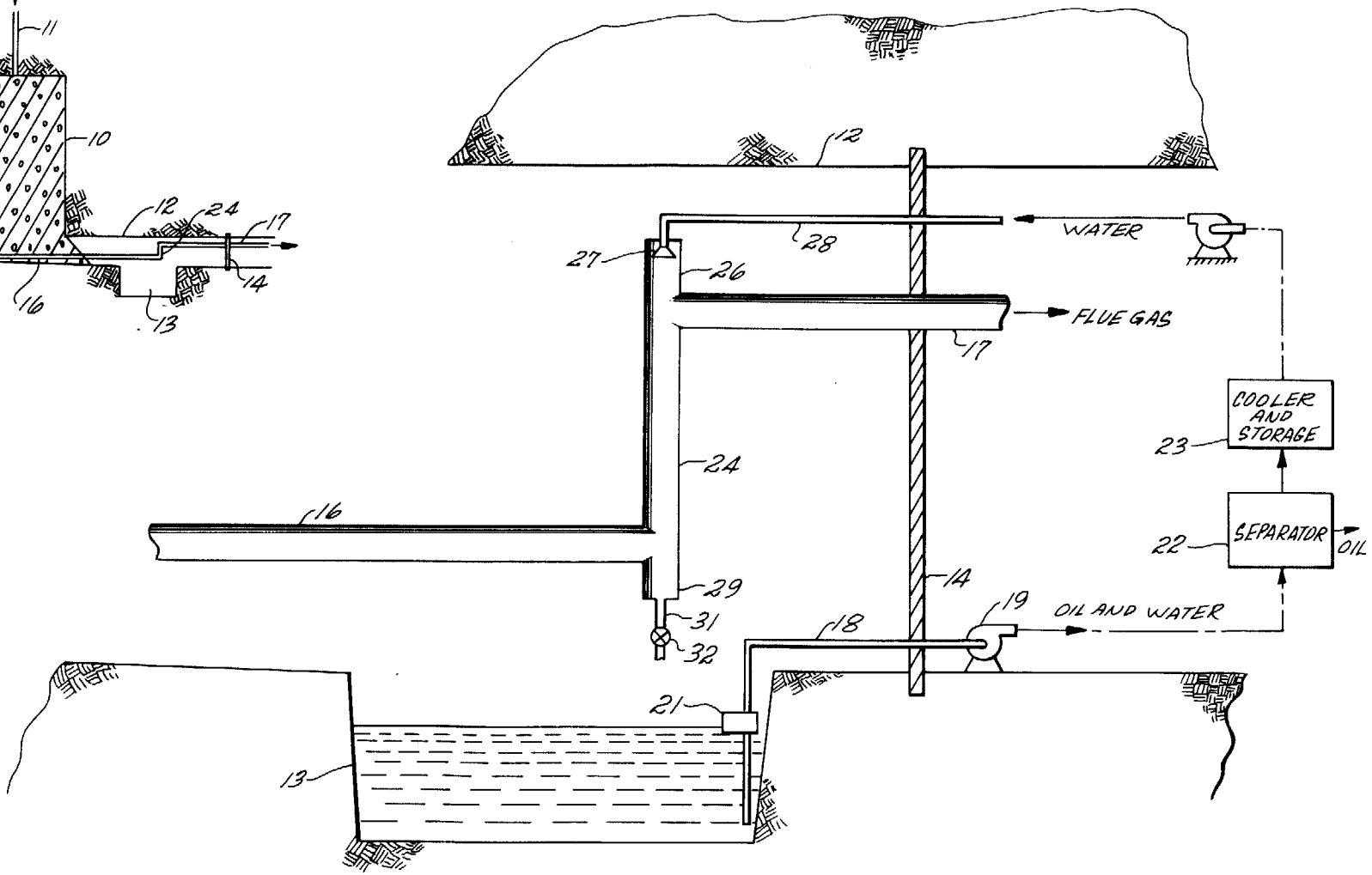

Matter enclosed in heavy brackets [ ] appears in the original patent but forms no part of this reissue specification; matter printed in italics indicates the additions made by reissue.

BACKGROUND

There are vast deposits of oil shale in the world containing massive reserves of oil that can supplement or replace petroleum supplies. The oil shale contains kerogen which is a solid carbonaceous material from which shale oil can be retorted. Shale oil is retorted by heating the oil shale to a sufficient temperature to decompose kerogen and produce a liquid product which drains from the rock. The spent shale after oil has been removed contains substantial amounts of residual carbon which can be burned to supply heat for retorting.

In a particularly desirable process for retorting oil shale a subterranean cavity or room is filled with an expanded mass of oil shale particles and retorting is conducted in situ. The expanded mass of particles and the underground retort are ordinarily formed explosively by any of a variety of known techniques. This retort is ordinarily filled to the top with a mass of oil shale particles known as a rubble pile. The top of this bed of oil shale particles is ignited and air is forced downwardly therethrough for combustion of carbonaceous material in the shale. Initially some of the shale oil may be burned, but as retorting progresses much of the combustion is of residual carbon remaining in the spent shale. This reduces the oxygen content of the air and the resultant gas passing downwardly through the retort below the combustion zone is essentially inert. This inert gas transfers heat downwardly and results in retorting of the shale below the combustion zone without appreciable combustion of the resulting oil. The flue gas at the bottom of the retort is largely nitrogen with carbon dioxide, carbon monoxide, water vapor, hydrogen, methane and traces of other hydrocarbon gases. The flue gas also has appreciable amounts of water and oil in the form of aerosol dispersions. It may also contain sulphur dioxide from the combustion processes. This flue gas is recovered at the bottom of the oil shale retort and may be vented after cleaning, burned for its heating value, or recycled through the retort.

During the early part of retort operation the flue gas is relatively cool since it flows through a bed of oil shale particles below the combustion zone that has not yet been heated. As retorting progresses however and particularly as the oil at the bottom of the retort is recovered, the temperature of the flue gas may become high enough that there are problems in handling it in economical systems. It is, therefore, desirable to find a technique for cooling the flue gas before withdrawing it from the retort area. If this cooling also results in reduction of entrained oil and water aerosols an added benefit is obtained.

BRIEF SUMMARY OF THE INVENTION

There is, therefore, provided in practice of this invention according to a presently preferred embodiment a system for cooling and cleaning flue gas from an in situ oil shale retort having a tunnel at the bottom of the retort and a sump in the floor of the tunnel for collecting oil and water from the retort. A gas tight bulkhead is provided in the tunnel beyond the sump for preventing escape of flue gas from the retort. The flue gas is collected at the bottom of the retort inside the bulkhead and it is passed upwardly through a conduit as it is withdrawn from the retort. Water is sparged into [the top of] the vertical portion of the conduit, *preferably at the top thereof,* so that it flows countercurrent to the flue gas and drains into the sump at the bottom of the retort.

DRAWINGS

Figure 1:
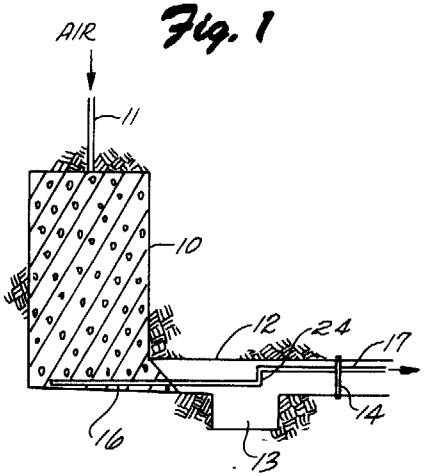

These and other features and advantages of the present invention will be appreciated as the same becomes better understood by reference to the following detailed description of a presently preferred embodiment when considered in connection with the accompanying drawings wherein:

FIG. 1 illustrates semi-schematically in vertical cross section an in situ oil shale retort; and FIG. 2 is an enlargement of a fragment of FIG. 1 illustrating means for cooling flue gas from the retort.

DESCRIPTION

FIG. 1 illustrates in vertical cross section a subterranean oil shale retort typically involved in practice of this invention. As illustrated in this embodiment the retort is in the form of a room 10 filled with fragmented oil shale particles. Ordinarily the underground room which is formed in substantially undisturbed shale, is formed as a result of explosive expansion of the oil shale particles in the room. The oil shale particles have a sufficient void volume distributed therein that gas can flow through the bed of particles. Air is introduced to the top of the retort through a conduit 11 for sustaining combustion of carbonaceous material in the oil shale. Ignition of the in situ retort is provided by heating a portion of the oil shale adjacent the conduit to a sufficient temperature to maintain combustion. Thereafter air is passed downwardly through the conduit and a combustion zone progresses gradually downwardly through the bed of oil shale particles in the retort. It will be recognized that this downward progression is relatively slow and the in situ retort may operate for several weeks.

Shale oil retorted from the bed of oil shale particles drains to the bottom of the retort and runs into a lateral tunnel 12 in the floor of which is a sump 13 for collecting the oil. Water may also accumulate in the sump from a variety of sources including leakage from subterranean aquifiers, products of combustion in the retort, decomposition of water bearing minerals, or from gas cooling as pointed out hereinafter. The bottom of the retort is sealed by a substantially gas tight bulkhead 14 which may for example be a steel plate cemented into the rock of the tunnel, a concrete barrier, or other appropriate gas seal.

One or more perforated flue gas collection pipes 16 extend into the rubble pile of oil shale particles in the retort so that flue gas is collected from the bottom (such pipes are positioned at the bottom of the room prior to blasting to create the room and rubble pile of oil shale fragments). The bed of oil shale particles is gas permeable and the collection conduits do not need to extend into the bed of particles in all instances. Thus, it will be apparent that gas can be collected at any point within the tunnel 12 inside of the gas tight bulkhead. In the illustrated embodiment it is preferred to have one or more perforated gas collection pipes within the bed of oil shale particles for more uniform gas collection over the cross section of the retort. The flue gas is conducted through the bulkhead by a conduit 17 for recirculation or use as mentioned above.

FIG. 2 is an enlargement of the portion of the tunnel 12 at the bottom of the retort adjacent the sump 13 and gas tight bulkhead 14. As indicated in this drawing oil and water collected in the sump are withdrawn by a pipe 18 connected to a pump 19 indicated schematically. A float 21 in the sump is used to control the pump 19 since it is not always necessary to operate continuously. When the liquid level in the sump rises to some selected point the pump is activated to lower the level. The oil and/or water from the sump are pumped to a conventional separator 22 where the oil and water are separated. The oil is the product sought and is thereafter conveyed in a conventional manner. The water passes to a storage pond 23 which incidentally serves to cool it as may be needed. The water from the sump is so called "sour water" which may contain some emulsified oil as well as soluble materials from the oil and shale.

Flue gas from the collection pipe 16 flows upwardly through a vertical riser 24 and thence laterally through the conduit 17 through the gas tight bulkhead. A short stub 26 is provided at the top of the vertical riser and a sparger 27 is positioned within it. A water line 28 extends through the gas tight bulkhead for feeding the sparger. In a typical embodiment water for the sparger is withdrawn from the cooling pond 23 so that sour water is recycled. Other sources of cool water may be employed as desired.

Another stub of pipe 29 is provided at the bottom of the vertical riser and a drain line 31 with a valve 32 leads to the sump 13. The valve 32 can be remotely controlled or can be left open when the bulkhead is sealed. In some circumstances the valve 32 can simply be eliminated and water collecting in the stub at the bottom of the riser can drain directly into the sump. The area of the drain line 31 is small and its open end is within the bulkhead so that there is no significant effect on the gas flow from the bottom of the retort.

When the retort has been operated for a period and the flue gas temperature rises to an undesirable level, water to the sparger 27 is turned on. The resulting spray of water flowing downwardly through the riser 24 is countercurrent to the upwardly flowing flue gas. The direct contact with the cooler water and vaporization of water significantly lower the temperature of the flue gas so that seals, equipment and the like downstream from the bulkhead are protected. In addition, the falling spray of water contacts entrained materials in the flue gas and removes them from the gas stream. The flue gas may contain small amounts of dust along with water and oil in the form of aerosols. Condensable vapors in the heated gas stream may also be removed by the cooling effect of the water. This mix of material flows through the drain line 31 into the sump from which it is recovered along with the other liquids recovered from the retorting operation. The flue gas is thus cooled by the sparged water and also has at least a portion of the entrained materials removed. The system is quite reliable and operates over long periods of time with no maintenance. In addition, it permits utilization of sour water from the retorting operation which is contaminated and should not be imposed on the environment.

Although but one embodiment of technique for handling flue gas at the bottom of an in situ retort has been described and illustrated herein many modifications and variations will be apparent to one skilled in the art. Thus, for example, the vertical riser 24 may be located outside the gas tight bulkhead with the drain line running back into the sump. As suggested above the collection conduit 16 need not extend under the bed of oil shale particles being retorted and can end anywhere in the tunnel inside the bulkhead. Thus, if desired the lateral collection conduit can be deleted and the bottom of the vertical riser left open so that gas can flow in from the region of the tunnel inside the bulkhead and water can drain directly back into the sump. The water can be drained onto the floor of the tunnel in a region where it will naturally flow back into the sump. It will also be apparent that if a greater degree of cooling is desired in the limited height of the tunnel additional vertical risers can be added in the conduit. Although in the illustrated arrangement the cross sections of the conduit and riser are similar it will be apparent that different size pipes can be used commensurate with the spray pattern from the sparger to enhance contact between the water spray and upflowing gas. Many other modifications and variations will be apparent to one skilled in the art and it is therefore to be understood that within the scope of the appended claims the invention may be practiced otherwise than as specifically described.

What is claimed is:

1. Apparatus for cleaning and cooling flue gas from an in situ oil shale retort comprising:

a tunnel at the bottom of the retort;

a sump in the floor of the tunnel for collecting oil and water from the retort;

a gas tight bulkhead in the tunnel beyond the sump for preventing escape of flue gas from the retort;

a conduit for collecting flue gas from the bottom of the retort having at least a vertical portion in the tunnel through which collected flue gas flows upwardly and a portion passing through the bulkhead for withdrawing flue gas from the retort;

a sparger [at the top of] *in* the vertical portion of the conduit for spraying water downwardly through the vertical portion countercurrent to the flue gas; and means for draining the sparged water into the sump.

2. An apparatus as defined in claim 1 wherein the vertical portion of the conduit is inside the bulkhead over the sump.

3. Apparatus as defined in claim 1 further comprising a closed stub above the vertical portion of the conduit and wherein the sparger is in the closed stub.

4. Apparatus as defined in claim 1 further comprising:

means for removing oil and water from the sump;

means for separating the oil and water; and means for recirculating the water to the sparger.

5. A method of cooling and cleaning flue gas from an in situ oil shale retort having a top air inlet, a bottom flue gas outlet, a sump at the bottom for collecting oil and water from the retort, and means for gas sealing the bottom of the retort comprising the steps of:

collecting flue gas in a conduit adjacent the bottom of the retort inside the means for gas sealing;

passing the collected flue gas upwardly;

spraying water downwardly countercurrent to the upwardly flowing flue gas;

withdrawing the flue gas through the means for gas sealing; and draining the water into the sump.

6. A method as defined in claim 5 further comprising the steps of:

removing oil and water from the sump.
separating the oil and water; and
recirculating the separated water for the spraying step.

*7. An apparatus as defined in claim 1 wherein the sparger is located at the top of the vertical portion of the conduit.*

* * * * *